United States Patent
Wang et al.

(10) Patent No.: US 11,797,123 B2
(45) Date of Patent: Oct. 24, 2023

(54) COPLANAR SENSOR

(71) Applicants: William Wang, New Taipei (TW); Yu-Sung Su, New Taipei (TW)

(72) Inventors: William Wang, New Taipei (TW); Yu-Sung Su, New Taipei (TW)

( * ) Notice: Subject to any disclaimer, the term of this patent is extended or adjusted under 35 U.S.C. 154(b) by 0 days.

(21) Appl. No.: 17/989,041

(22) Filed: Nov. 17, 2022

(65) Prior Publication Data

US 2023/0176682 A1    Jun. 8, 2023

(30) Foreign Application Priority Data

Dec. 6, 2021   (TW) .................................. 110145495

(51) Int. Cl.
 *G06F 3/041* (2006.01)
 *G06F 3/044* (2006.01)

(52) U.S. Cl.
 CPC ........ *G06F 3/04164* (2019.05); *G06F 3/0443* (2019.05); *G06F 3/0446* (2019.05)

(58) Field of Classification Search
 CPC .. G06F 3/04164; G06F 3/0443; G06F 3/0446; G06F 3/044; G06F 2203/04111; G02F 1/13338
 See application file for complete search history.

(56) References Cited

U.S. PATENT DOCUMENTS

| | | | | |
|---|---|---|---|---|
| 2012/0127387 A1* | 5/2012 | Yamato | ................. | G06F 3/0445 174/250 |
| 2015/0160754 A1* | 6/2015 | Wenzel | ............ | G06F 3/041662 345/174 |
| 2019/0056812 A1* | 2/2019 | Wang | ................... | G06F 3/0443 |
| 2019/0179468 A1* | 6/2019 | Chen | ..................... | G06F 3/0446 |
| 2022/0155896 A1* | 5/2022 | Na | ......................... | H10K 59/40 |

\* cited by examiner

*Primary Examiner* — Amy Onyekaba
(74) *Attorney, Agent, or Firm* — MUNCY, GEISSLER, OLDS & LOWE, P.C.

(57) ABSTRACT

A coplanar sensor includes a plurality of first sensing units and a plurality of second sensing units. Each of the first sensing units includes a plurality of first electrode blocks that are spaced apart from each other in a first direction, and a first connecting line that is electrically coupled to the first electrode blocks. Each of the second sensing units includes a plurality of second electrode blocks that are spaced apart from each other in a second direction intersecting the first direction, and a second connecting line that is electrically coupled to the second electrode blocks. Each of the first electrode blocks has a first sensing surface. Each of the second electrode blocks has a second sensing surface. The first sensing surfaces of the first electrode blocks and the second sensing surfaces of the second electrode blocks are coplanar.

9 Claims, 12 Drawing Sheets

COPLANAR SENSOR

CROSS-REFERENCE TO RELATED APPLICATION

This application claims priority to Taiwanese Invention Patent Application No. 110145495, filed on Dec. 6, 2021.

FIELD

This disclosure relates to a sensor, and more particularly to a coplanar sensor.

BACKGROUND

Referring to FIG. 1 and FIG. 2, a known touch sensor includes a substrate 91, a plurality of first sensing units 92 that are formed on a top surface of the substrate 91, that extend in a longitudinal direction, and that are arranged in a transverse direction transverse to the longitudinal direction, and a plurality of second sensing units 93 that are formed on a bottom surface of the substrate 91 (i.e., the first sensing units 92 and the second sensing units 93 are respectively located on two opposite sides of the substrate 91), that extend in the transverse direction, and that are arranged in the longitudinal direction.

Each of the first sensing units 92 includes a plurality of first electrodes 921 that are spaced apart from each other along the longitudinal direction, and a plurality of first connecting lines 922, each of which interconnects two adjacent ones of the first electrodes 921. Each of the second sensing units 93 includes a plurality of second electrodes 931 that are spaced apart from each other along the transverse direction, and a plurality of second connecting lines 932, each of which interconnects two adjacent ones of the second electrodes 931. An orthographic projection of each of the second connecting lines 932 onto a horizontal plane intersects that of a respective one of the first connecting lines 922, such that each of the second connecting lines 932 and the respective one of the first connecting lines 922 cooperate with two corresponding ones of the second electrodes 931 and two corresponding ones of the first electrodes 921 that are adjacent thereto to form a touch-sensitive pixel (see region 90 in FIG. 1, which is defined by dot-dash broken lines and illustrates the boundary of one of the touch-sensitive pixels when the touch sensor is viewed from one side of the first sensing units 92 opposite to the substrate 91). The touch-sensitive pixels are used for detecting a change in capacitance when an animal (e.g., human being) approaches or touches the touch-sensitive pixels, and the change can be subsequently converted into image data that correspond to the biological characteristics of the animal by a processor.

However, a shortest distance (T1) between each of the first electrodes 921 and one of the second electrodes 931 adjacent thereto is defined by a projection distance (T2) that is between the orthographic projection of the first electrode 921 and that of the one of the second electrodes 931 on a horizontal plane, and by a thickness (T3) of the substrate 91. Therefore, the distance (T1) may be relatively long. Since the capacitance between each of the first electrodes 921 and the one of the second electrodes 931 adjacent thereto is inversely proportional to the distance (T1), when the touch sensor is in operation, the change in capacitance may not be significant enough to be detected, resulting in difficulty in converting the change into image data and obtaining detailed information that corresponds to the biological characteristics (e.g., it is difficult to enhance image resolution and detail to show patterns such as ridges and valleys of a fingerprint). Thus, the current touch sensor needs to be further developed and improved.

SUMMARY

Therefore, an object of the disclosure is to provide a coplanar sensor that can alleviate at least one of the drawbacks of the prior art.

According to the disclosure, the coplanar sensor includes a plurality of first sensing units and a plurality of second sensing units. Each of the first sensing units includes a plurality of first electrode blocks that are spaced apart from each other in a first direction, and a first connecting line that is electrically coupled to the first electrode blocks. The first sensing units are spaced apart from each other in a second direction that intersects the first direction. Each of the second sensing units includes a plurality of second electrode blocks that are spaced apart from each other in the second direction, and a second connecting line that is electrically coupled to the second electrode blocks, that is spaced apart from the first connecting lines of the first sensing units, and that is configured to be not electrically coupled to the first connecting lines. The second sensing units are spaced apart from each other in the first direction. Each of the second connecting lines is spaced apart from the first connecting lines in a third direction that intersects the first and the second directions. The first electrode blocks and the second electrode blocks are located on a same imaginary plane. Each of the first electrode blocks has a first sensing surface. Each of the second electrode blocks has a second sensing surface. The first sensing surfaces of the first electrode blocks and the second sensing surfaces of the second electrode blocks are coplanar. For each of the first sensing units, the first connecting line extends in the first direction and is located on one side of the first electrode blocks opposite to the first sensing surfaces. Each of the first sensing units further includes a plurality of first conduction blocks. For each of the first sensing units, each of the first conduction blocks is electrically coupled to the first connecting line and a respective one of the first electrode blocks, and is located between the first connecting line and the respective one of the first electrode blocks in the third direction.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

DETAILED DESCRIPTION

Figure 1:
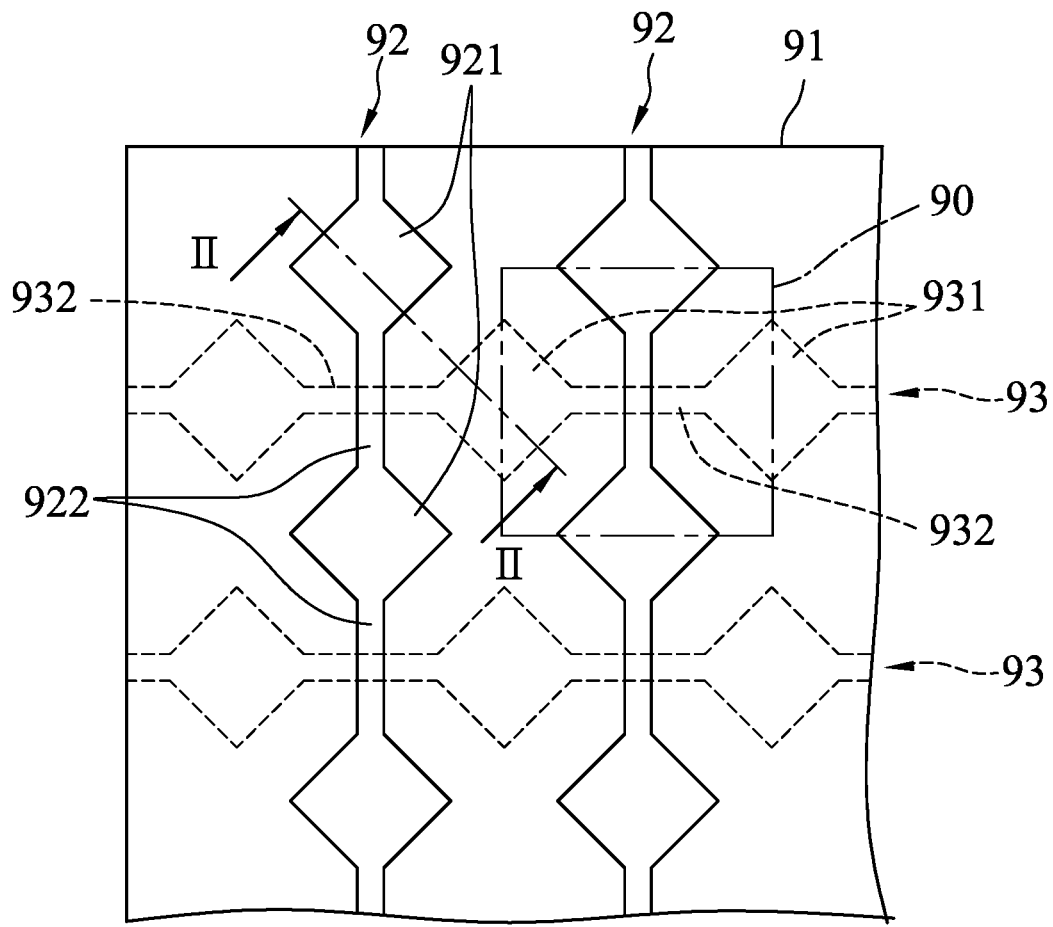
FIG. 1 is a fragmentary top view of a conventional touch sensor.
Figure 2:
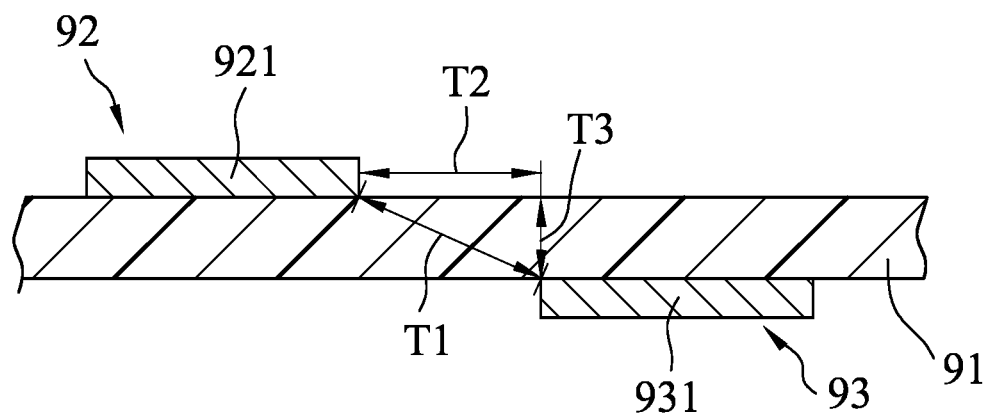
FIG. 2 is a fragmentary sectional view taken along line II-II in FIG. 1, illustrating the touch sensor.

Before the disclosure is described in greater detail, it should be noted that where considered appropriate, reference numerals or terminal portions of reference numerals have been repeated among the figures to indicate corresponding or analogous elements, which may optionally have similar characteristics.

Figure 3:
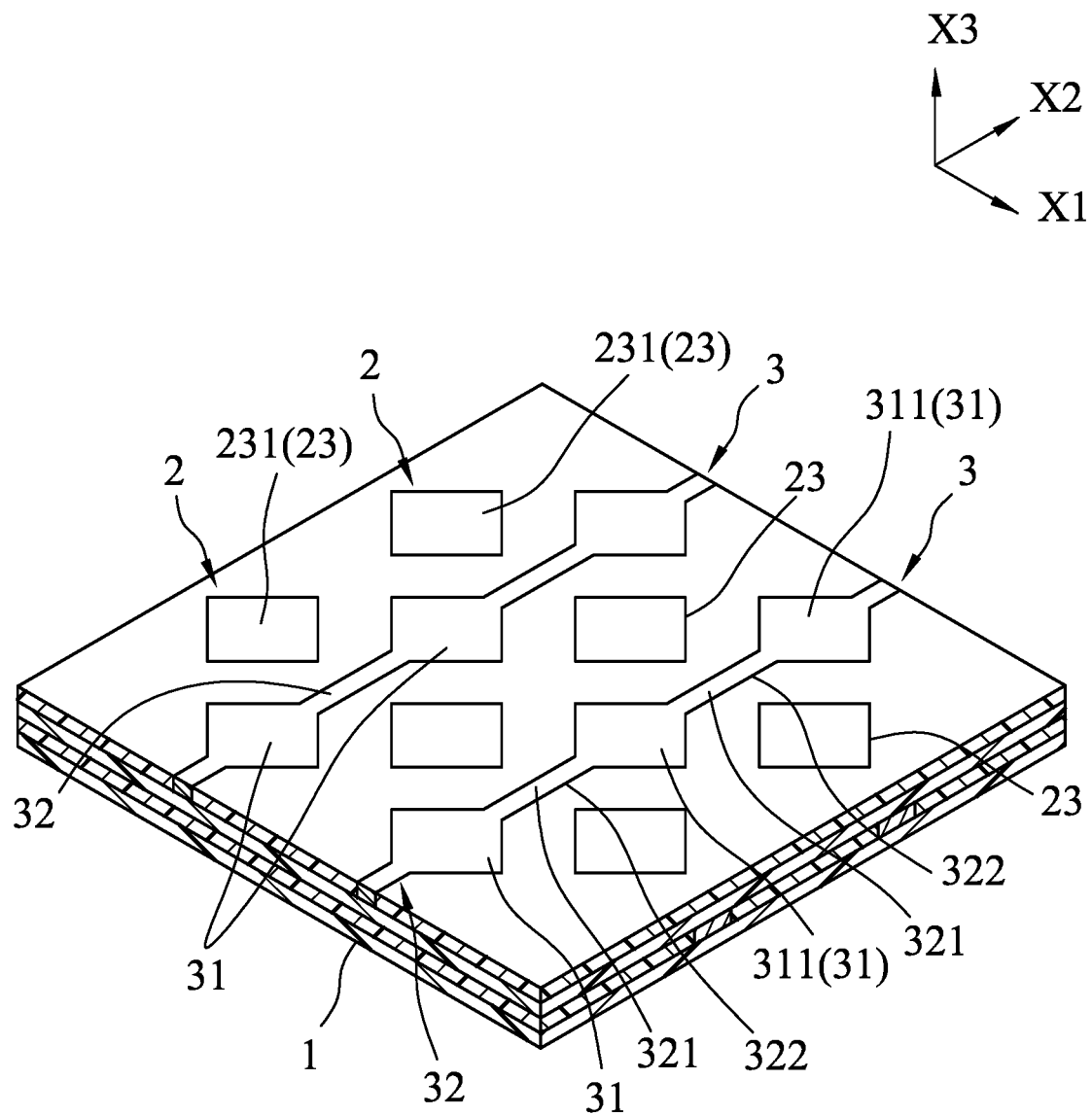
FIG. 3 is a perspective view of a first embodiment of a coplanar sensor according to the disclosure.
Figure 4:
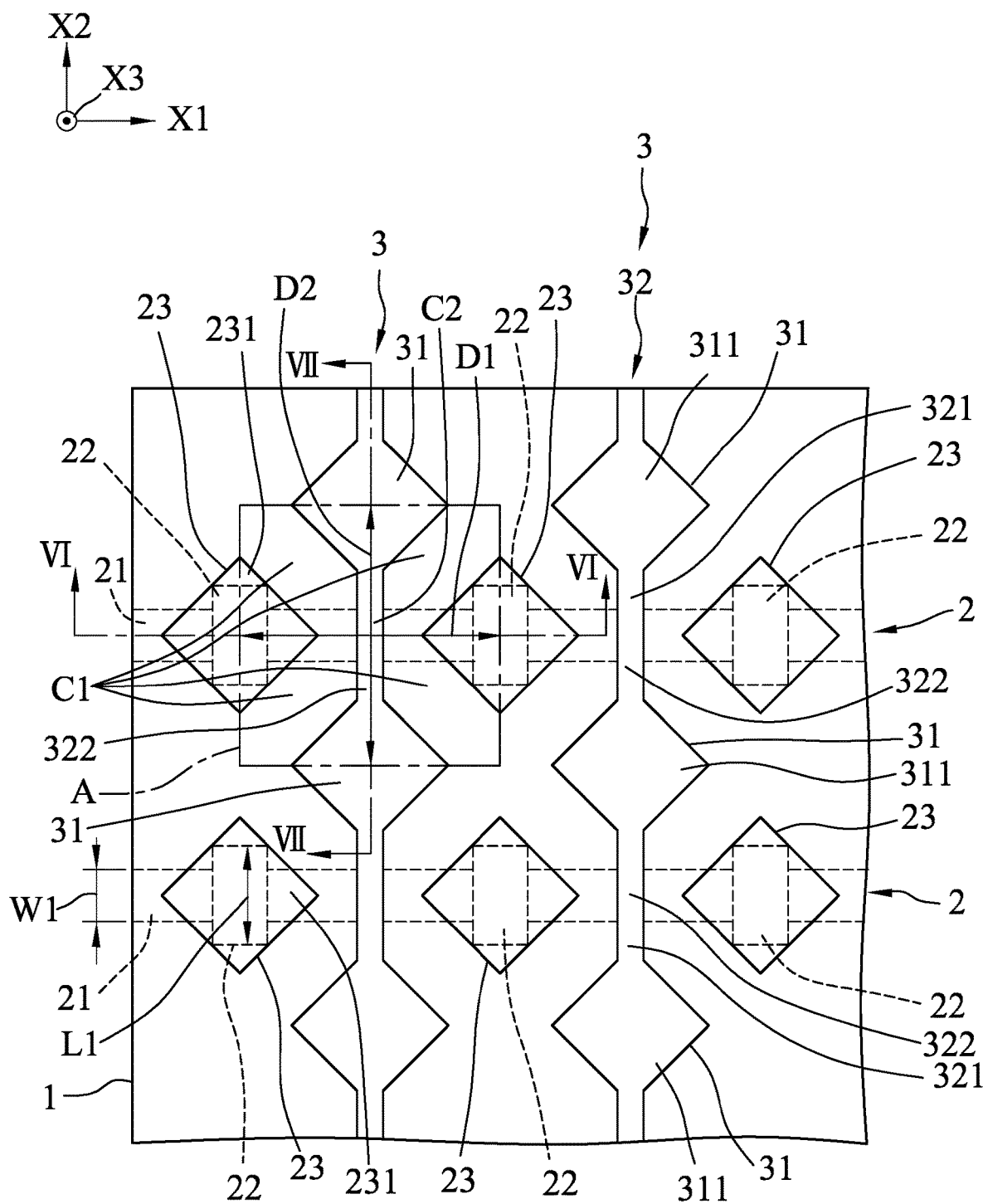
FIG. 4 is a fragmentary top view of the first embodiment.
Figure 5:
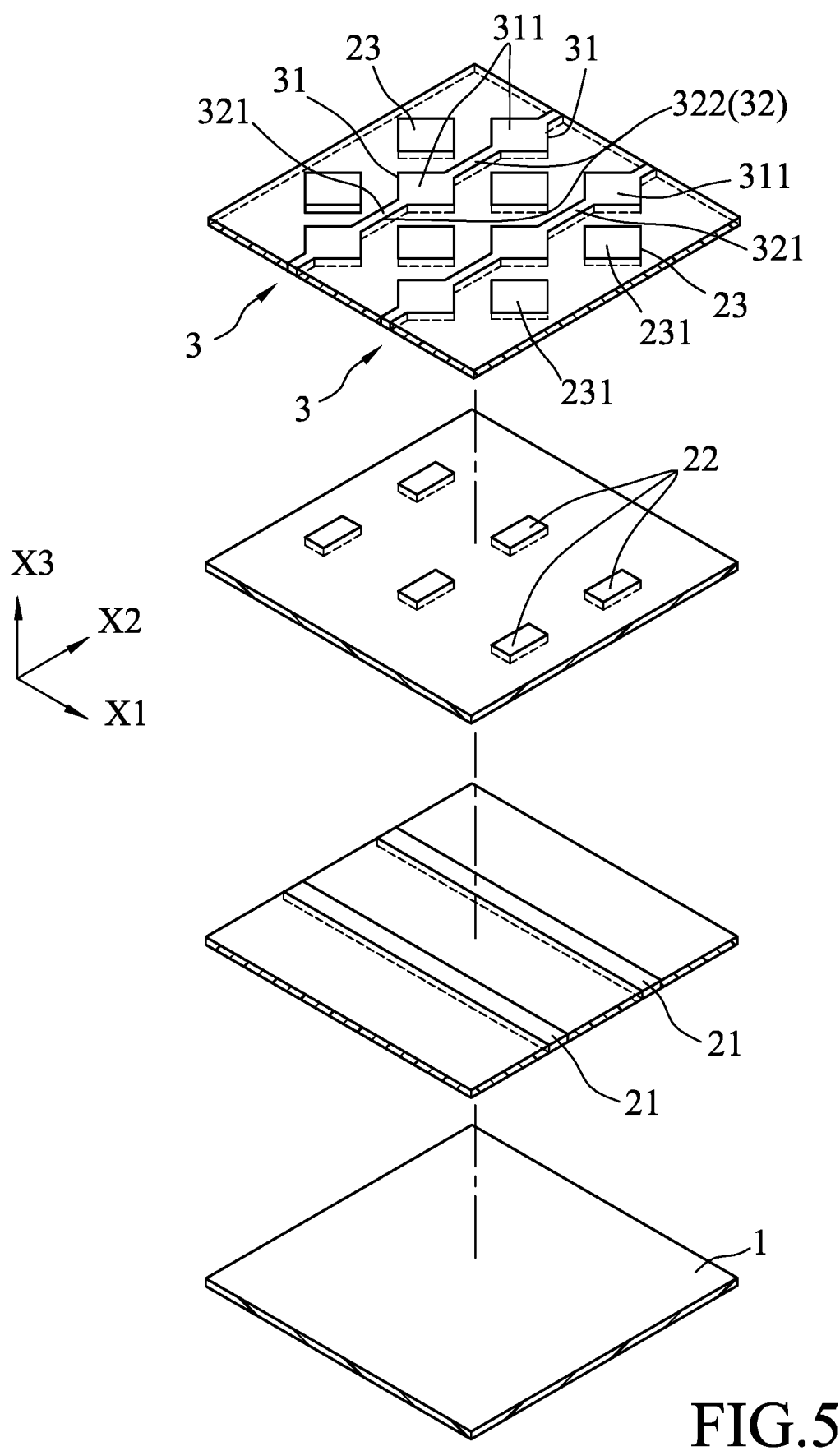
FIG. 5 is an exploded perspective view of the first embodiment.
Figure 6:
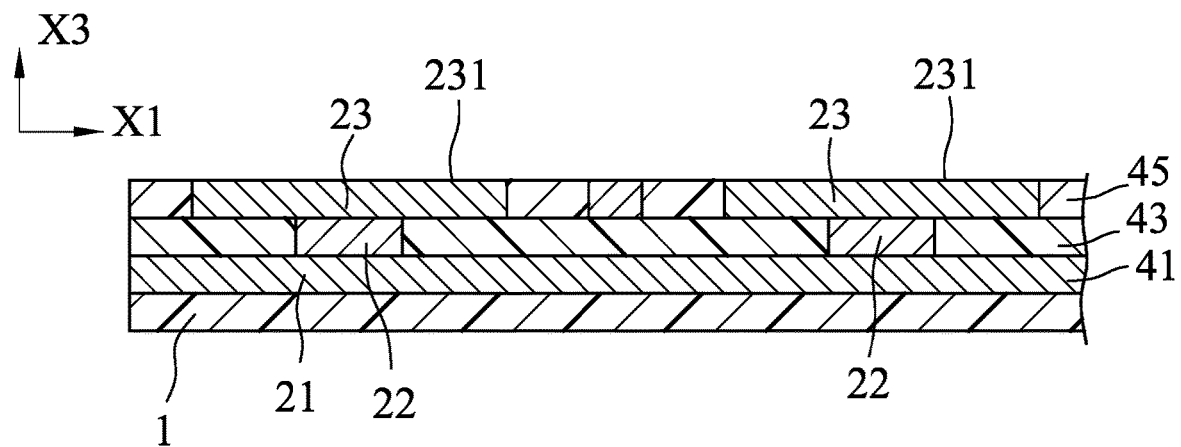
FIG. 6 is a fragmentary sectional view taken along line VI-VI in FIG. 4.

Referring to FIG. 3 to FIG. 5, a first embodiment of a coplanar sensor according to the disclosure includes a substrate 1, and a plurality of first sensing units 2 and a plurality of second sensing units 3 that are disposed on the substrate Referring to FIG. 4 to FIG. 6, the substrate 1 is configured to be made of polyimide, which may be abbreviated as PI, and the first sensing units 2 and the second sensing units 3 are formed on the substrate 1 via a semiconductor manufacturing process.

Each of the first sensing units 2 includes a first connecting line 21 that is disposed on the substrate 1 and that extends in a first direction (X1), a plurality of first conduction blocks 22 that are disposed on a top surface of the first connecting line 21 and that are spaced apart from each other along the first direction (X1), and a plurality of first electrode blocks 23 that are spaced apart from each other along the first direction (X1), and that are respectively disposed on top surfaces of the first conduction blocks 22 so that the first connecting line 21 is electrically coupled to the first electrode blocks 23. In one embodiment, each of the first electrode blocks 23 is configured to be square-shaped, but is not limited thereto. Each of the first electrode blocks 23 has a first sensing surface 231. For each of the first sensing units 2, the first connecting line 21 is located on one side of the first electrode blocks 23 opposite to the first sensing surfaces 231.

The first sensing units 2 are spaced apart from each other in a second direction (X2) that is orthogonal to the first direction (X1). For each of the first sensing units 2, each of the first conduction blocks 22 is electrically coupled to the first connecting line 21 and a respective one of the first electrode blocks 23, and is located between the first connecting line 21 and the respective one of the first electrode blocks 23 in a third direction (X3). The third direction (X3) is orthogonal to the first direction (X1), and is orthogonal to the second direction (X2).

In addition, for each of the first sensing units 2, the first connecting line 21 has a first connecting line width (W1) (see FIG. 4) in the second direction (X2), and each of the first conduction blocks 22 has a rectangular cross-section on an imaginary plane orthogonal to the third direction (X3), and a first conduction block length (L1) (see FIG. 4) in the second direction (X2). In this embodiment, for each of the first sensing units 2, the first connecting line width (W1) is smaller than the first conduction block length (L1) such that a bottom surface of each of the first conduction blocks 22 spans the first connecting line 21, and a portion of projection of each of the first conduction blocks 22 does not overlap a projection of the first connecting line 21 on an imaginary plane orthogonal to the third direction (X3). However, in certain embodiments, for each of the first sensing units 2, the first conduction block length (L1) may be equal to the first connecting line width (W1).

Figure 7:
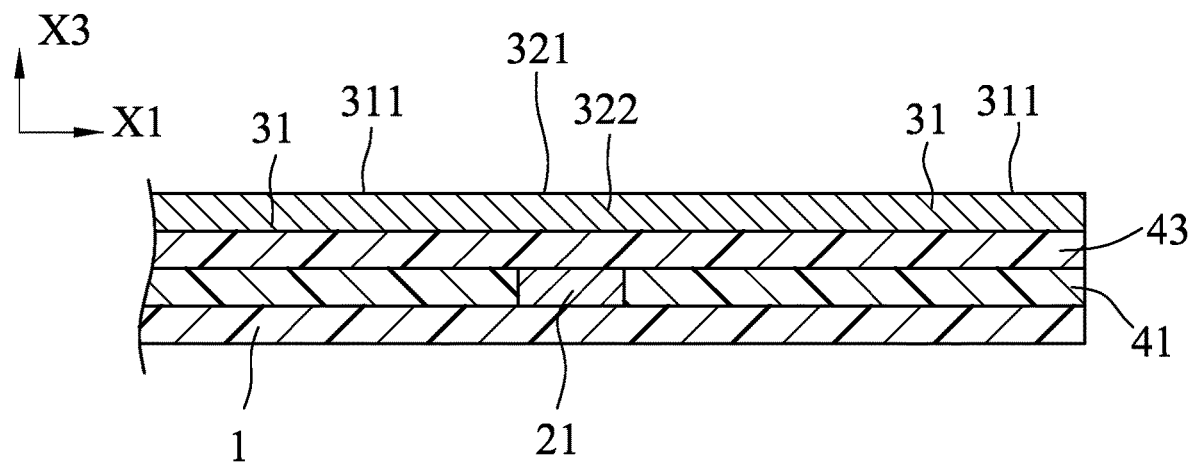
FIG. 7 is a fragmentary sectional view taken along line VII-VII in FIG. 4.
Figure 8:
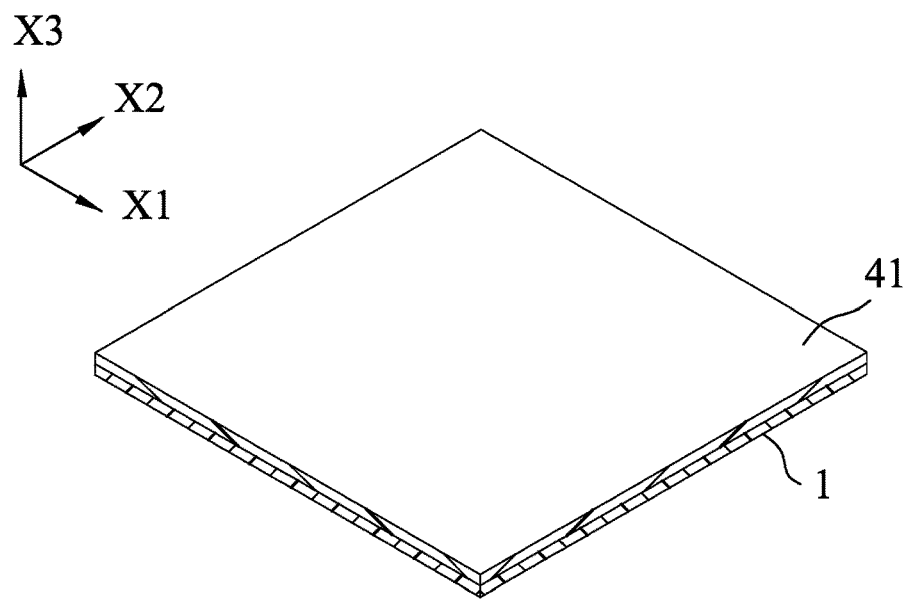
FIGS. 8 to 16 are schematic views illustrating a manufacturing process of the first embodiment.
Figure 9:
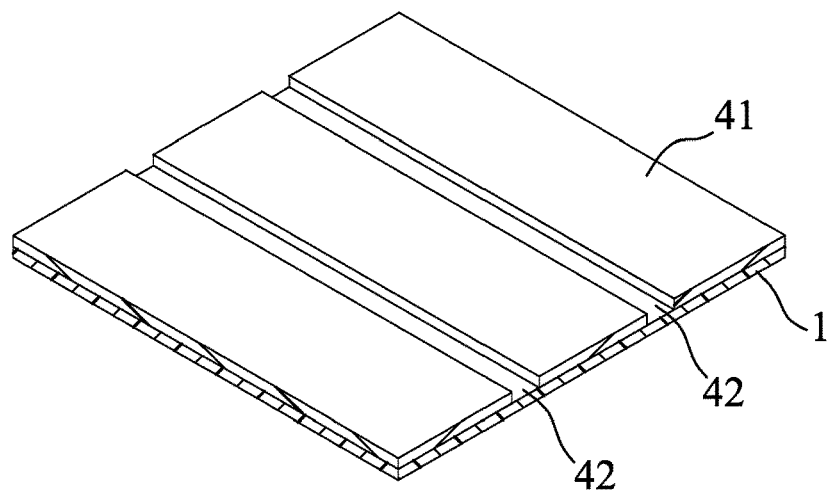
Figure 10:
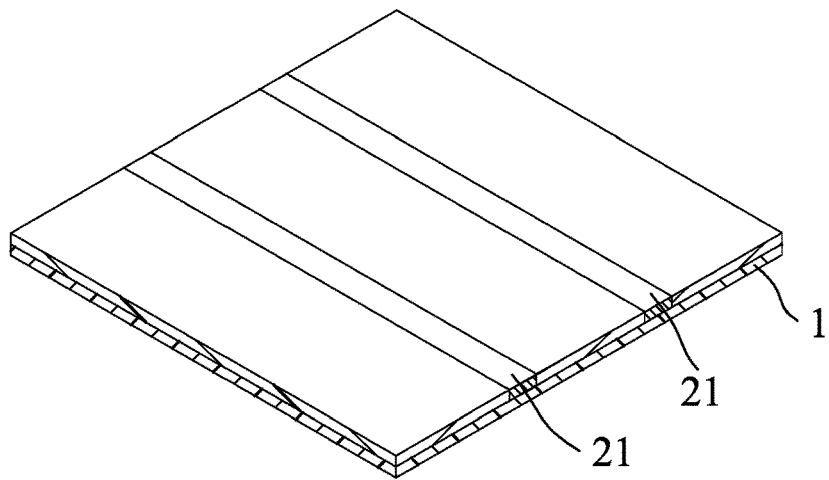
Figure 11:
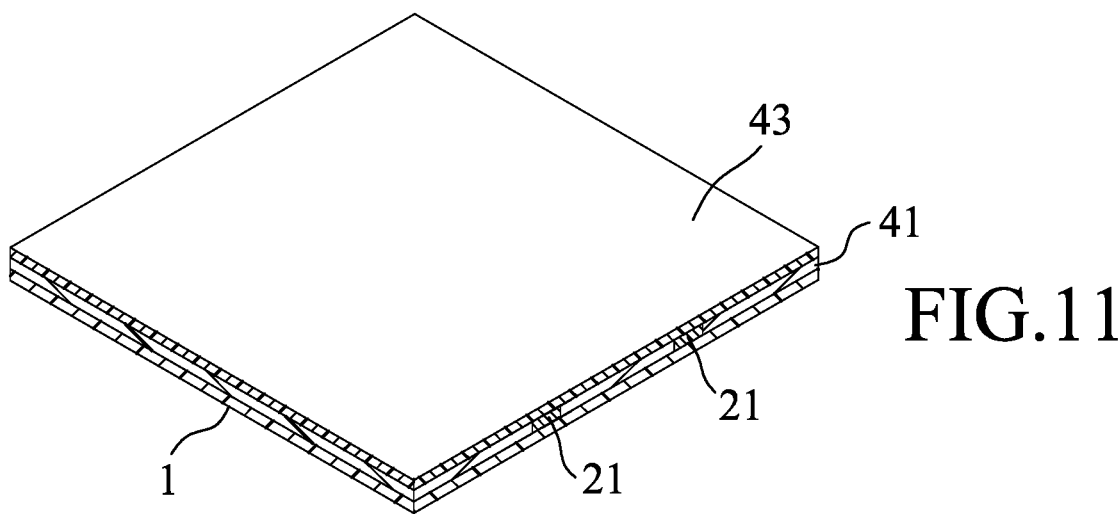
Figure 12:
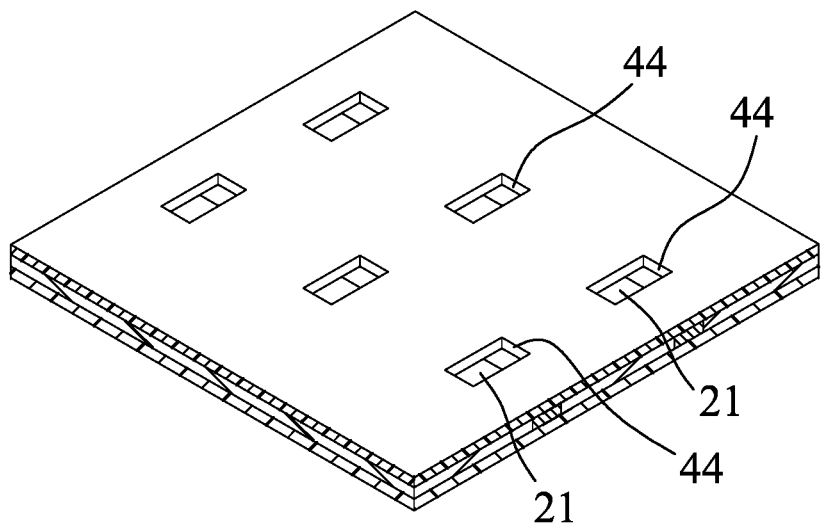
Figure 13:
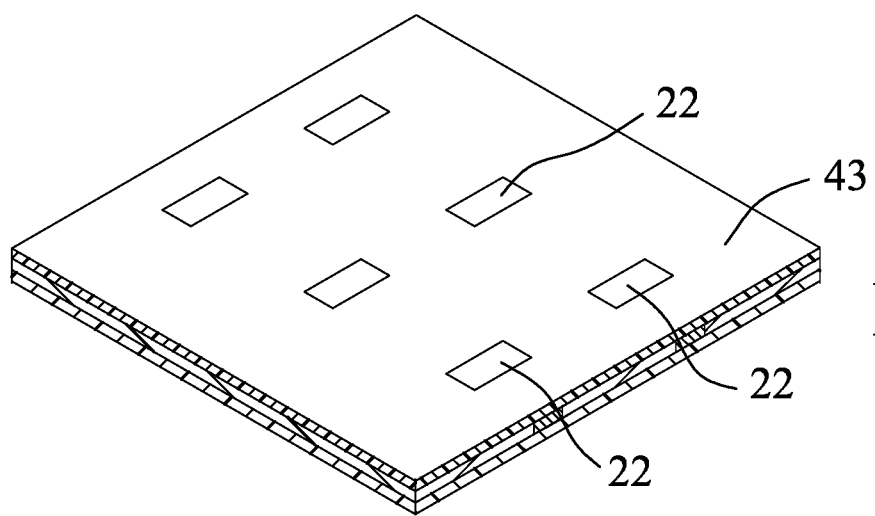
Figure 14:
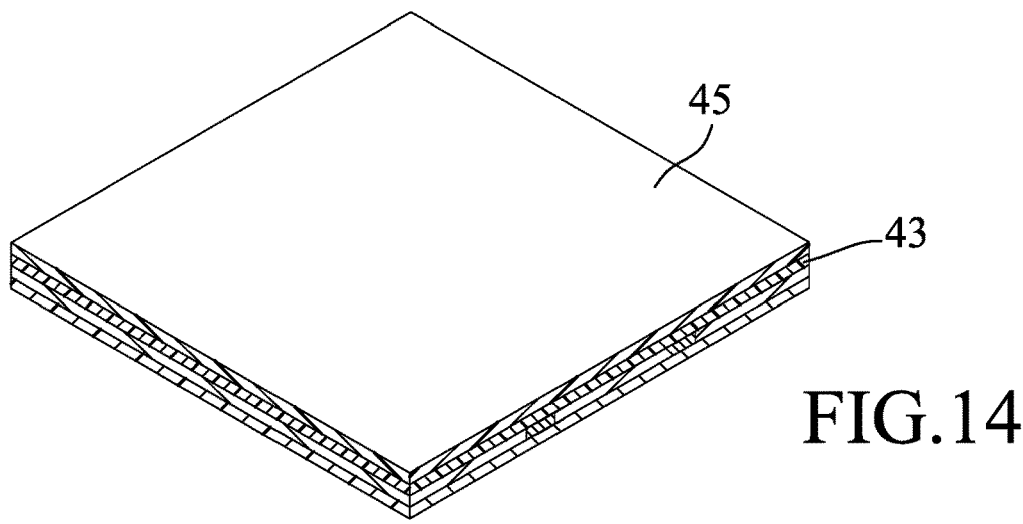
Figure 15:
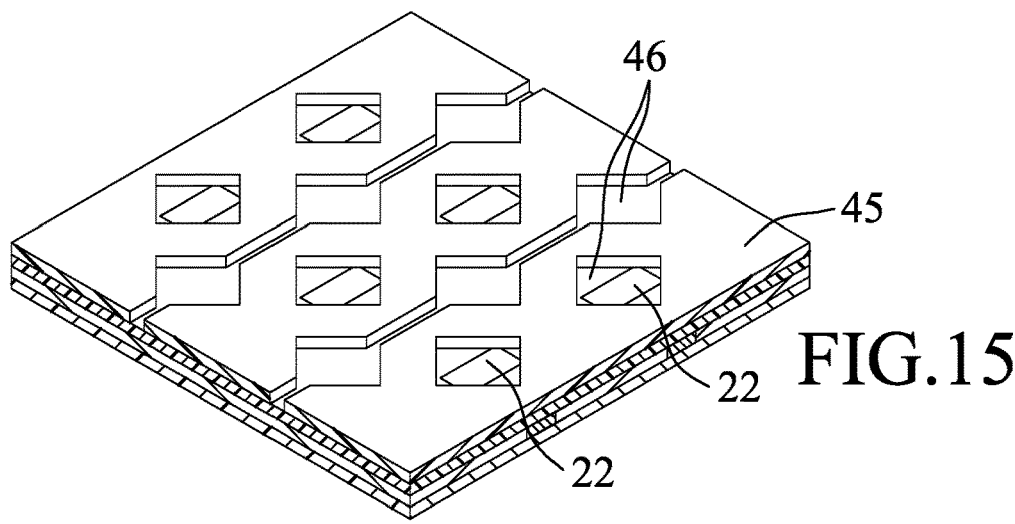
Figure 16:
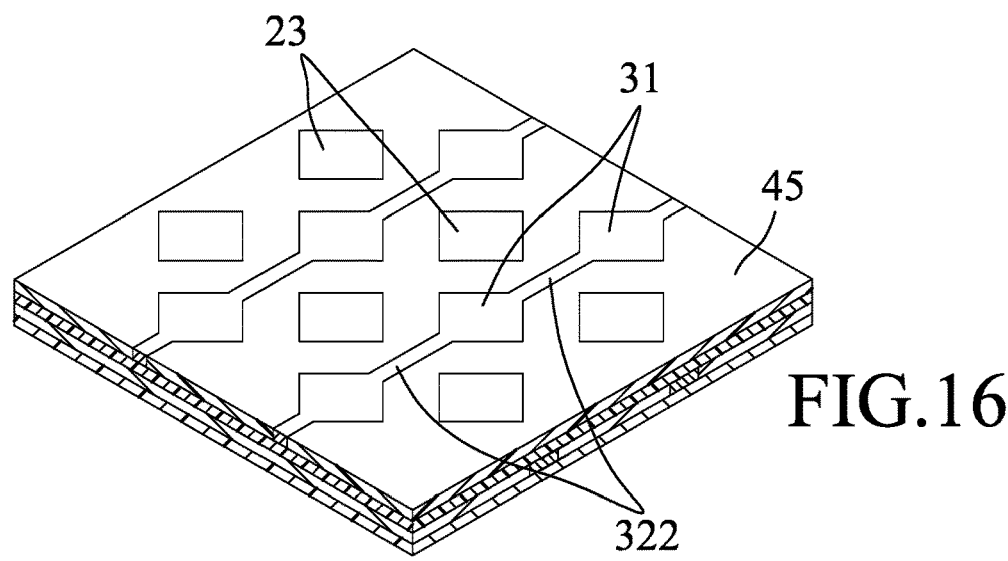

Referring to FIG. 4, FIG. 5 and FIG. 7, the second sensing units 3 are spaced apart from each other in the first direction (X1). Each of the second sensing units 3 includes a plurality of second electrode blocks 31 that are disposed on the substrate 1 and that are spaced apart from each other along the second direction (X2), and a second connecting line 32 that is electrically coupled to the second electrode blocks 31, and that has a plurality of connecting sections 322. Each of the second electrode blocks 31 has a second sensing surface 311. For each of the second sensing units 3, each of the connecting sections 322 extends in the second direction (X2), is integrally connected between two adjacent ones of the second electrode blocks 31, has a third sensing surface 321, is spaced apart from the first connecting lines 21 of the first sensing units 2, and is configured to be not electrically coupled to the first connecting lines 21. Specifically, each of the second connecting lines 32 is spaced apart from the first connecting lines 21 in the third direction (X3), and an orthographic projection of each of the second connecting lines 32 onto a horizontal plane intersects that of each of the first connecting lines 21. In this embodiment, each of the second electrode blocks 31 is configured to be square-shaped, but is not limited thereto. The first electrode blocks 23 and the second electrode blocks 31 are located on a same imaginary plane. The first sensing surfaces 231 face the same direction as the second sensing surfaces 311, and are coplanar with the second sensing surfaces 311 and the third sensing surfaces 321.

Referring to FIG. 8 to FIG. 16, the coplanar sensor is manufactured via the following steps. First, a first insulation layer 41 is formed on the substrate 1, and a portion of the first insulation layer 41 is removed via photolithography and etching so as to form a plurality of first slots 42, each of which extends through the first insulating layer 41 in the third direction (X3). Then, a conductive material (e.g., metal) is filled into the first slots 42 to form the first connecting lines 21.

Next, a second insulation layer 43 is formed on a top surface of the first insulation layer 41 and top surfaces of the first connecting lines 21, and a portion of the second insulation layer 43 is then removed via photolithography and etching so as to form a plurality of second slots 44, each of which extends through the second insulation layer 43 in the third direction (X3) for exposing a portion of each of the first connecting lines 21. Afterwards, a conductive material (e.g., metal) is filled into the second slots 44 to form the first conduction blocks 22.

Then, a third insulation layer 45 is formed on a top surface of the second insulation layer 43 and top surfaces of the first conduction blocks 22, and a portion of the third insulation layer 45 is removed via photolithography and etching so as to form a plurality of third slots 46, each of which extends through the third insulation layer 45 in the third direction (X3). Some of the third slots 46 are for exposing the first conduction blocks 22. Finally, a conductive material (e.g., metal) is filled into the third slots 46 to form the first electrode blocks 23, the second electrode blocks 31 and the connecting sections 322 of the second connecting line 32, and the process of manufacturing the coplanar sensor is thus completed.

Referring to FIG. 4 and FIG. 12 again, because for each of the first sensing units 2, the first conduction block length (L1) of each of the first conduction blocks 22 is greater than the first connecting line width (W1), tolerance for registration errors during the process of photolithography is increased, which enables each of the first conduction blocks 22 to easily interconnect the first connecting line 21 and the respective one of the first electrode blocks 23. Consequently, manufacturing yield rate and production reliability of the coplanar sensor is improved.

Referring to FIG. 4 again, when the coplanar sensor is a fingerprint or palmprint sensor and is viewed in the third direction (X3), each of intersections of the first sensing units 2 and the second sensing units 3 cooperates with two adjacent ones of the first electrode blocks 23 and two adjacent ones of the second electrode blocks 31 to define a touch-sensitive pixel (A). When a user's finger or palm approaches or makes contact with the first sensing surfaces 231, the second sensing surfaces 311 and the third sensing surface 321 within one of the touch-sensitive pixels (A), a change in electric current that flows through the one of the touch-sensitive pixels (A) is then detected and converted into a change in capacitance in the one of the touch-sensitive pixels (A). Each of the touch-sensitive pixels (A) includes a plurality of first sensing capacitors (C1), each of which is formed between one of the first electrode blocks 23 within the touch-sensitive pixels (A) and one of the second electrode blocks 31 that is adjacent to the one of the first electrode blocks 23 and that is within the touch-sensitive pixels (A), and a second sensing capacitor (C2) formed at the intersection of projections of and between the respective one of the first connecting lines 21 and the respective one of the second connecting lines 32. Since the value of capacitance is inversely proportional to the distance between any two electrodes, and since the first electrode blocks 23 and the second electrode blocks 31 are located on the same plane, each of the first sensing capacitors (C1) of the coplanar sensor has a shorter distance, compared with the conventional touch sensor, between the respective one of the first electrode blocks 23 and the respective one of the second electrode blocks 31. Therefore, the change in capacitance generated by the user's finger or palm may be more precisely detected.

Moreover, when the user's finger is in contact with or approaches the sensing pixels (A), the finger carries a portion of electric charges away from the coplanar sensor, and thus generates a change in voltage. Therefore, the coplanar sensor is also capable of calculating a change in an electric field of the sensing pixels (A) via an equation that calculates the electric field between two charged parallel metal plates, then the coplanar sensor may convert the calculated results, via a processor (not shown) therein, into image data that correspond to the fingerprint of the user's finger. In contrast to the change in capacitance that is calculated based on the change in electric currents, which is prone to interference such as noise, the conversion of the change in voltage or electric field into the change in capacitance is less likely to be affected by noise, and therefore image resolution and detail may be enhanced.

In one embodiment, for each of the first sensing units 2, a first distance (D1) between centers of two adjacent ones of the first electrode blocks 23 ranges from 40 micrometers (hereinafter: μm) to 200 μm, and, for each of the second sensing units 3, a second distance (D2) between centers of two adjacent ones of the second electrode blocks 31 ranges from 40 μm to 200 μm. By virtue of the abovementioned configuration, the dimensions of each of the sensing pixel (A) range from 40 μm to 200 μm, so that ridges and valleys of the user's fingerprints may be precisely detected, and that the processor of the coplanar sensor may subsequently convert the detected results into image data that show detailed fingerprint patterns.

Figure 17:
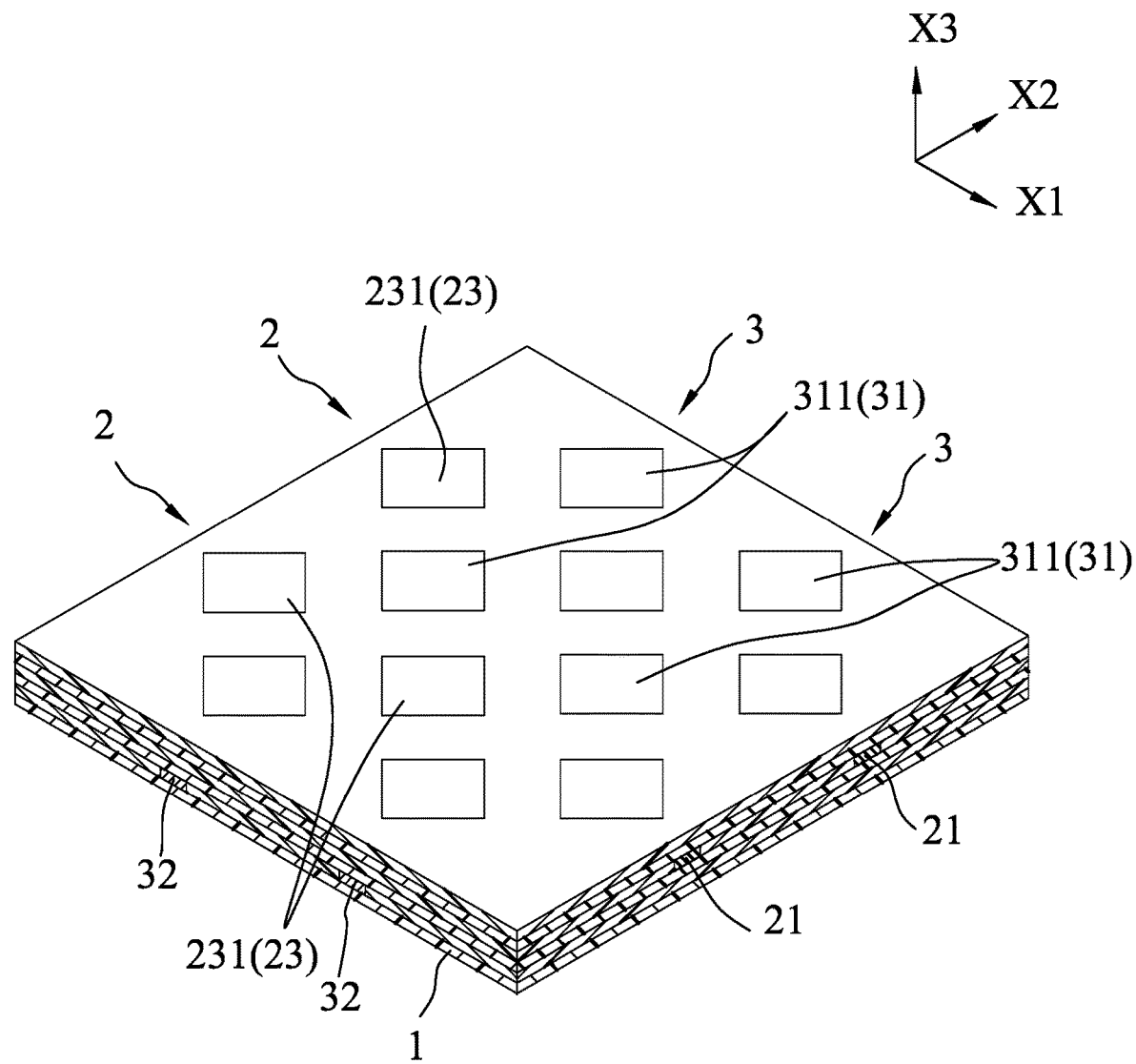
FIG. 17 is a perspective view of a second embodiment of the coplanar sensor according to the disclosure.
Figure 18:
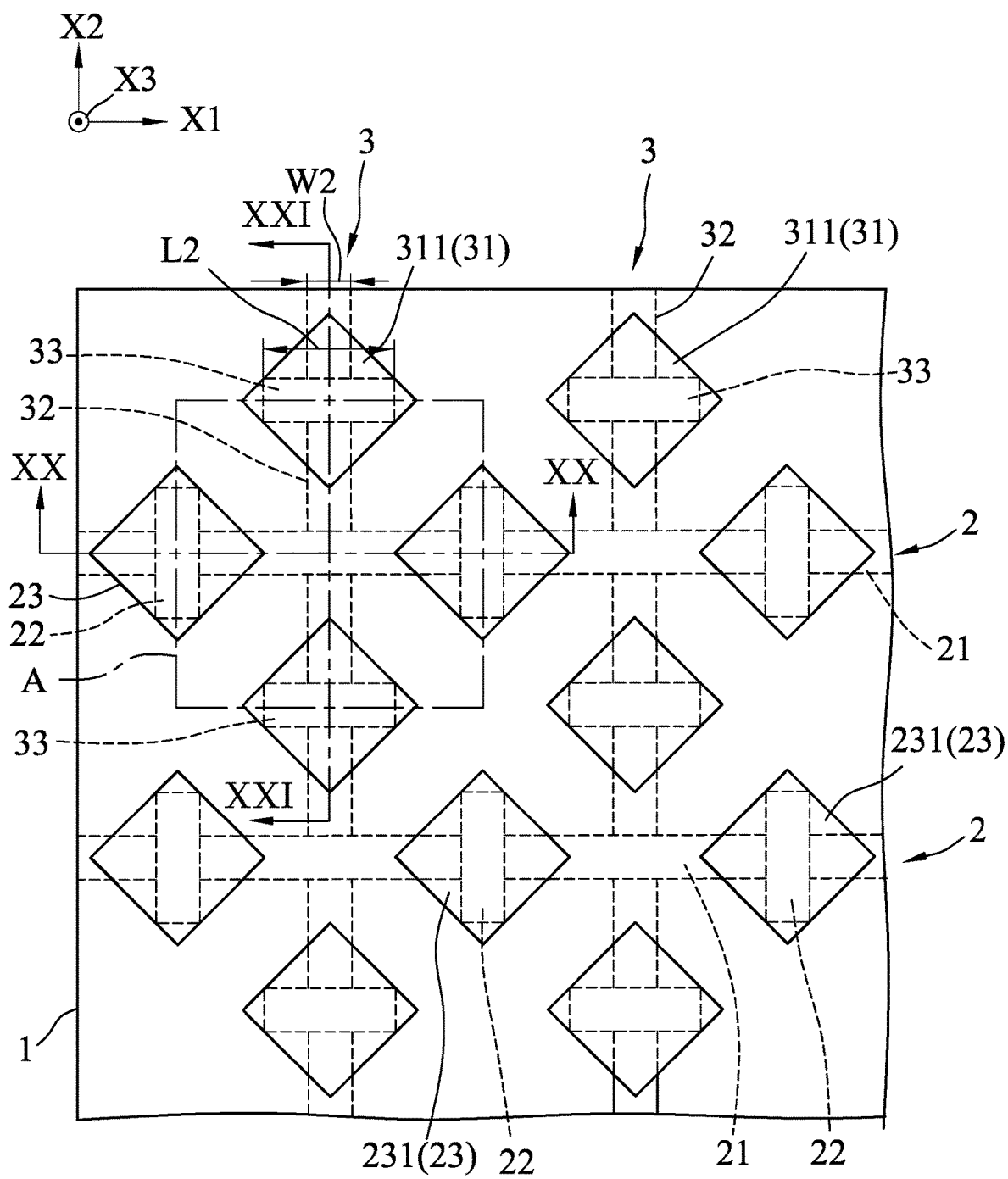
FIG. 18 is a fragmentary top view of the second embodiment.
Figure 19:
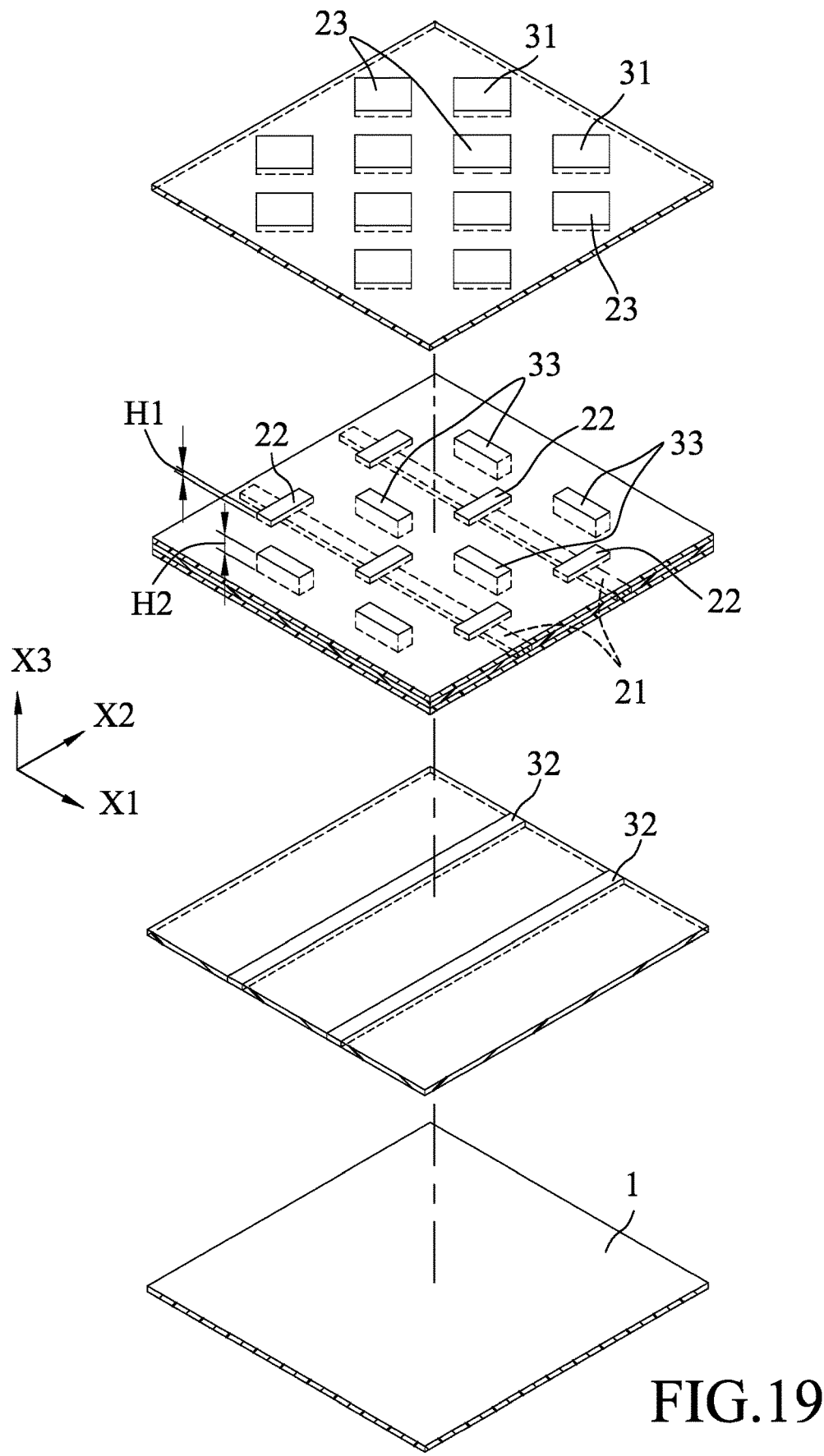
FIG. 19 is an exploded perspective view of the second embodiment.

Referring to FIG. 17 to FIG. 19, a second embodiment of the coplanar sensor according to the disclosure is similar to the first embodiment, but includes different configurations of the first sensing units 2 and the second sensing units 3.

Figure 20:
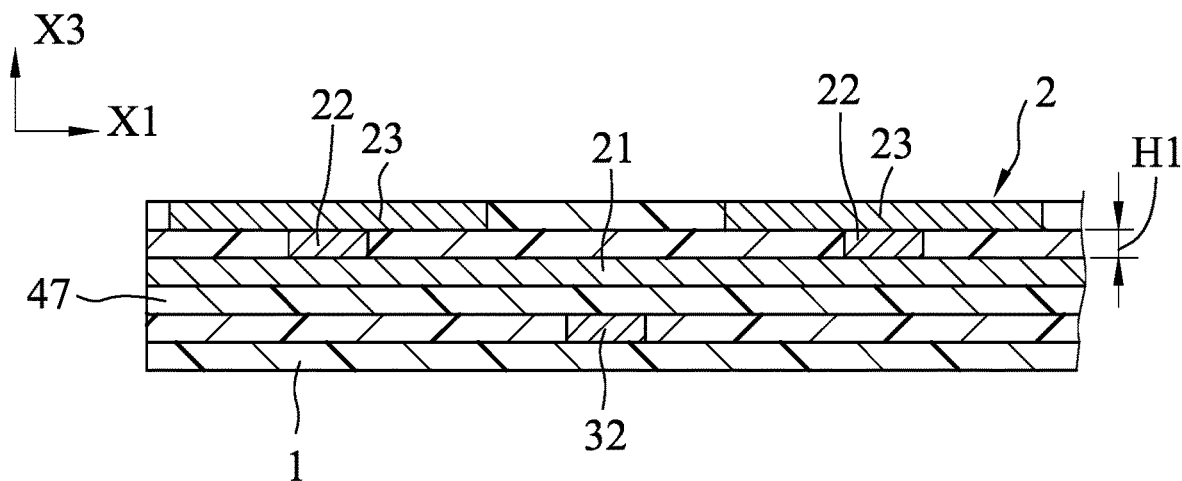
FIG. 20 is a fragmentary sectional view taken along line XX-XX in FIG. 18.

In the second embodiment, for each of the second sensing units 3, the second connecting line 32 extends in the second direction (X2), and is located on one side of the second electrode blocks 31 opposite to the second sensing surfaces 311. Specifically, the second connecting lines 32 are formed on a top surface of the substrate 1. Each of the second sensing units 3 further includes a plurality of second conduction blocks 33. For each of the second sensing units 3, each of the second conduction blocks 33 is electrically coupled between the second connecting line 32 and a respective one of the second electrode blocks 31, and is located between the second connecting line 32 and the respective one of the second electrode block 31 in the third direction (X3), such that the second connecting line 32 is electrically coupled to the second electrode blocks 31. Referring to FIG. 20, in this embodiment, the coplanar sensor further has a fourth insulation layer 47 located between the second connecting lines 32 and the first connecting lines 21.

Figure 21:
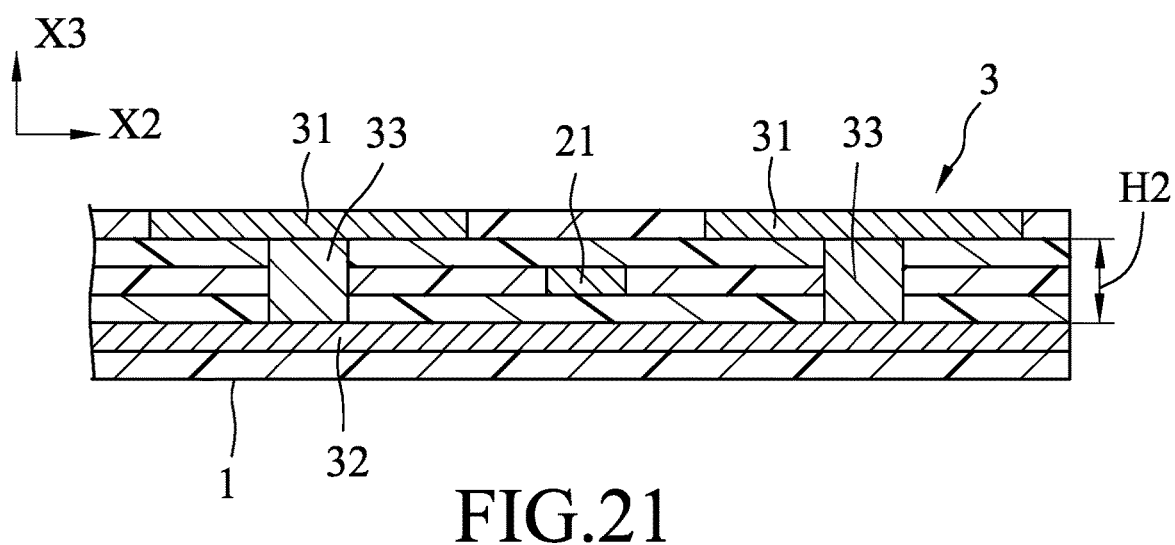
FIG. 21 is a fragmentary sectional view taken along line XXI-XXI in FIG. 18.

Referring to FIG. 19 to FIG. 21, furthermore, a first height (H1) of each of the first conduction blocks 22 in the third direction (X3) is smaller than a second height (H2) of each of the second conduction blocks 33 in the third direction (X3), such that in each of the first sensing units 2 and each of the second sensing units 3, a distance between the first connecting line 21 and each of the first electrode blocks 23 in the third direction (X3) is smaller than that between the second connecting line 32 and each of the second electrode blocks 31 in the third direction (X3). In addition, referring to FIG. 18 again, for each of the second sensing units 3, each of the second conduction block 33 has a rectangular cross-section on an imaginary plane orthogonal to the third direction (X3), and a second conduction block length (L2) in the first direction (X1), and the second connecting line 32 has a second connecting line width (W2) in the first direction (X1) that is smaller than the second conduction block length (L2). For each of the second sensing units 3, a bottom surface of each of the second conduction blocks 33 spans the second connecting line 32 so that a portion of projection of each of the second conduction blocks 33 does not overlap projection of the second connecting line 32 on an imaginary plane orthogonal to the third direction (X3). However, in certain embodiments, for each of the second sensing units 3, the second conduction block length (L2) may be equal to the second connecting line width (W2).

In the second embodiment, the first sensing surfaces 231 of the first electrode blocks 23 and the second sensing surfaces 311 of the second electrode blocks 31 are coplanar, and precision of the sensing pixels (A) may also be increased as in the first embodiment.

In summary, by virtue of the first electrode blocks 23 and the second electrode blocks 31 being coplanar, the distance between each of the first electrode blocks 23 and any one of the second electrode blocks 31 adjacent thereto may effectively be reduced, thereby greatly enhancing the accuracy and precision of the sensing capability of the sensing pixels (A), and further increasing the signal-to-noise ratio such that the image resolution of the coplanar sensor is improved.

Furthermore, by virtue of the first distance (D1) between two adjacent ones of the first electrode blocks 23 and the second distance (D2) between two adjacent ones of the second electrode blocks 31 being limited to ranging from 40 µm to 200 µm, the fingerprint patterns may effectively be detected. Consequently, the coplanar sensor may be used in a sensing device that requires a high level of security.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is(are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A coplanar sensor comprising:

a plurality of first sensing units, wherein each first sensing unit of the plurality of first sensing units includes a plurality of first electrode blocks that are spaced apart from each other in a first direction, and a first connecting line that is electrically coupled to the plurality of first electrode blocks, the plurality of first sensing units being spaced apart from each other in a second direction that intersects the first direction; and a plurality of second sensing units, wherein each second sensing unit of the plurality of second sensing units includes a plurality of second electrode blocks that are spaced apart from each other in the second direction, and a second connecting line that is electrically coupled to the plurality of second electrode blocks, that is spaced apart from the first connecting line of each first sensing unit of the plurality of first sensing units, and that is configured not to be electrically coupled to the first connecting lines;

wherein the plurality of second sensing units are spaced apart from each other in the first direction, the second connecting line of each second sensing unit of the plurality of second sensing units is spaced apart from the first connecting lines in a third direction that intersects the first and the second directions, and the plurality of first electrode blocks and the plurality of second electrode blocks are located on a same imaginary plane;

wherein each first electrode block of the plurality of first electrode blocks has a first sensing surface, each second electrode block of the plurality of second electrode blocks has a second sensing surface, and the first sensing surface of each first electrode block of the plurality of first electrode blocks and the second sensing surfaces of each second electrode block of the plurality of second electrode blocks are coplanar;

wherein for each first sensing unit of the plurality of first sensing units, the first connecting line extends in the first direction and is located on one side of the plurality of first electrode blocks opposite to the first sensing surfaces;

wherein each first sensing unit of the plurality of first sensing units further includes a plurality of first conduction blocks, and for each first sensing unit of the plurality of first sensing units, each first conduction block of the plurality of first conduction blocks is electrically coupled to the first connecting line and a respective first electrode block of the plurality of first electrode blocks; and wherein for each first sensing unit of the plurality of first sensing units, each first conduction block of the plurality of first conduction blocks is located between the first connecting line and the respective first electrode block of the plurality of first electrode blocks in the third direction.

2. The coplanar sensor as claimed in claim 1, wherein the second connecting line of each second sensing unit of the plurality of second sensing units has a plurality of connecting sections, for each second sensing unit of the plurality of second sensing units, each connecting section of the plurality of connecting sections extends in the second direction and is integrally connected between two adjacent ones of the second electrode blocks, and each connecting section of the plurality of connecting sections has a third sensing surface that is coplanar with the first sensing surfaces and the second sensing surfaces.

3. The coplanar sensor as claimed in claim 1, wherein for each first sensing unit of the plurality of the first sensing units, each first conduction block of the plurality of first conduction blocks has a rectangular cross-section on an imaginary plane orthogonal to the third direction, and a first conduction block length in the second direction, and the first connecting line has a first connecting line width in the second direction that is equal to the first conduction block length.

4. The coplanar sensor as claimed in claim 1, wherein for each first sensing unit of the plurality of first sensing units, each first conduction block of the plurality of first conduction blocks has a rectangular cross-section on an imaginary plane orthogonal to the third direction, and a first conduction block length in the second direction, and the first connecting line has a first connecting line width in the second direction that is smaller than the first conduction block length.

5. The coplanar sensor as claimed in claim 1, wherein the second connecting line of each second sensing unit of the plurality of second sensing units extends in the second direction and is located on one side of the plurality of second electrode blocks opposite to the second sensing surfaces, each second sensing unit of the plurality of second sensing units further including a plurality of second conduction blocks, for each second sensing unit of the plurality of second sensing units, each second conduction block of the plurality of second conduction blocks being electrically coupled between the second connecting line and a respective second electrode block of the plurality of second electrode blocks, and wherein for each second sensing unit of the plurality of second sensing units, each second conduction block of the plurality of second conduction blocks is located between the respective second electrode block of the plurality of second electrode blocks and the second connecting line in the third direction.

6. The coplanar sensor as claimed in claim 5, wherein for each second sensing unit of the plurality of second sensing units, each second conduction block of the plurality of second conduction blocks has a rectangular cross-section on an imaginary plane orthogonal to the third direction, and a second conduction block length in the first direction, and the second connecting line has a second connecting line width in the first direction that is equal to the second conduction block length.

7. The coplanar sensor as claimed in claim 5, wherein for each second sensing unit of the plurality of second sensing units, each second conduction block of the plurality of second conduction blocks has a rectangular cross-section on an imaginary plane orthogonal to the third direction, and a second conduction block length in the first direction, and the second connecting line has a second connecting line width in the first direction that is smaller than the second conduction block length.

8. The coplanar sensor as claimed in claim 1, wherein, for each first sensing unit of the plurality of first sensing units, a first distance between centers of two adjacent ones of the first electrode blocks ranges from 40 micrometers to 200 micrometers, and for each second sensing unit of the plurality of second sensing units, a second distance between centers of two adjacent ones of the second electrode blocks ranges from 40 micrometers to 200 micrometers.

9. The coplanar sensor as claimed in claim 1, further comprising a substrate on which the plurality of first sensing units and the plurality of second sensing units are disposed.

* * * * *